United States Patent

Matsuyama et al.

[11] Patent Number: 6,114,053
[45] Date of Patent: Sep. 5, 2000

[54] METHOD OF OVERLAYING BY LASER BEAM AND OVERLAYING STRUCTURE

[75] Inventors: Hidenobu Matsuyama; Shinji Nishino; Kouichi Kanai, all of Kanagawa-ken, Japan

[73] Assignee: Nissan Motor Co., Ltd., Kanagawa-ken, Japan

[21] Appl. No.: 09/054,505

[22] Filed: Apr. 3, 1998

[30] Foreign Application Priority Data

Apr. 15, 1997 [JP] Japan ................................ 9-097414

[51] Int. Cl.$^7$ .................. B32B 15/01; F16J 9/00
[52] U.S. Cl. ................ 428/652; 123/188.8; 427/597; 428/599; 428/615; 428/636
[58] Field of Search ................ 428/599, 615, 428/636, 652; 123/188.8; 219/76.1, 76.12; 427/556, 597, 554

[56] References Cited

U.S. PATENT DOCUMENTS 4,723,518  2/1988  Kawasaki et al. .............. 123/188.8
4,725,708  2/1988  Kawasaki et al. .............. 219/121.64
5,912,057  6/1999  Nishimura et al. .............. 427/597

FOREIGN PATENT DOCUMENTS 2-196117  8/1990  Japan .

*Primary Examiner*—Deborah Jones
*Assistant Examiner*—Robert R. Koehler
*Attorney, Agent, or Firm*—McDermott, Will & Emery

[57] ABSTRACT

A method of overlaying by a laser beam, comprises the steps of: relatively moving and irradiating a laser beam with respect to a base metal and simultaneously putting an other metal material than the base metal material on the base metal surface; and forming an overlay layer by melting the other metal material, wherein the overlay operation is performed in such a manner that an inclined angle θ with respect to the base metal surface of the beginning end portion surface becomes a range of $8°<θ<27°$.

2 Claims, 4 Drawing Sheets

FIG.5

| INCLINED ANGLE $\theta$ | 5 | 10 | 15 | 20 | 25 | 30 | 35 | 40 |
|---|---|---|---|---|---|---|---|---|
| CRACK GENERATING STATE | × | ○ | ○ | ○ | △ (1) | × | × | × |

FIG.6

| INCLINED ANGLE $\theta$ | 3 | 4 | 5 | 6 | 7 | 8 | 9 | 10 | 11 | 12 | 13 | 14 |
|---|---|---|---|---|---|---|---|---|---|---|---|---|
| CRACK GENERATING STATE | × | × | × | × | × | △ (1) | ○ | ○ | ○ | ○ | ○ | ○ |

FIG.7

| INCLINED ANGLE $\theta$ | 24 | 25 | 26 | 27 | 28 | 29 | 30 | 31 | 32 | 33 | 34 |
|---|---|---|---|---|---|---|---|---|---|---|---|
| CRACK GENERATING STATE | ○ | ○ | ○ | △ (1) | △ (2) | × | × | × | × | × | × |

METHOD OF OVERLAYING BY LASER BEAM AND OVERLAYING STRUCTURE

BACKGROUND OF THE INVENTION

1. Field of the Invention

The present invention relates to a method of overlaying by a laser beam and an overlaying structure in which a laser beam is irradiated while putting the other metal material other than a base metal material to a base metal surface so as to melt the other metal material and form an overlay layer.

2. Description of the Related Arts

A technique for forming an overlay layer made of the other metal material other than a base metal on the base metal by irradiating a laser beam in accordance with the related art is applied to, for example, a valve seat portion in a cylinder head of an engine for an automotive vehicle (for example, refer to Japanese Patent Application Laid-Open No. 2-196117).

Since the valve seat portion mentioned above is under a serious condition such as a repeated contact by the valve during an engine operation, an exposure to a high temperature and the like, in the case of making the cylinder head mentioned above made of an aluminum alloy in view of lightening, there is a risk that an abrasion and a welding loss are generated, so that an overlay layer by the other metal material having a high heat resistance and abrasion resistance is formed.

In the technique for overlaying the other metal material, since a tightness between a cylinder head body (a base metal) and an overlay layer corresponding to a valve seat material is high in comparison with a conventional technique of pressing a valve seat material made of a cast iron and an iron sintered material to a recess portion formed in the valve seat portion, a heat conductivity between both materials is good, so that a thermal load in the valve seat portion and the valve is reduced and an improvement of a durability and an improvement of an output performance in an engine can be achieved.

In the case of forming the overlay layer on a ring-like portion such as the valve seat mentioned above, it is necessary to form an overlap portion by overlapping a terminal end portion with a beginning end portion corresponding to an overlaying operation starting portion for the overlay layer. Accordingly, an amount of the overlay can be secured in the portion.

The structure of the overlap portion is large at a degree of 70 degrees of an inclined angle θ with respect to a surface of the base metal on the surface of the beginning end portion. In such a case, at a time when the terminal end portion starts overlapping with the beginning end portion, since the inclined angle θ is large, the terminal end portion in a melting state is hard to be attached to the beginning end portion, and the overlap starting portion of the overlay layer with respect to the surface of the beginning end portion S on the base metal is hard to be melted with the base metal and the beginning end portion, so that the portion becomes a non-deposited portion and generates a crack. On the contrary, in the case of making the inclined angle θ small as a degree of about 5 degrees, the structure of the overlap portion is made such that a melting amount of the base metal is increased due to an excess thermal conduction to the base metal and a mixing amount of the base metal to the overlay layer in a melting state is increased, so that a crack is easily generated in the overlay layer after solidification.

SUMMARY OF THE INVENTION

The present invention has been achieved with such points in mind.

It therefore is an object of the present invention to provide a method of overlaying by a laser beam and the overlaying structure thereby forming a high quality overlay layer without generating a non-deposited portion and a crack in an overlap portion in which a beginning end portion and a terminal end portion are overlapped with each other.

To achieve the object, according to a first aspect of the present invention, there is provided a method of overlaying by a laser beam, comprising the steps of: relatively moving and irradiating a laser beam with respect to a base metal and simultaneously putting another metal material other than the base metal material on the base metal surface; and forming an overlay layer by melting the other metal material, wherein at a time of forming the overlay layer by overlapping a terminal end portion corresponding to an overlay operation finishing portion over a beginning end portion corresponding to an overlay operation starting portion of the overlay layer, the overlay operation is performed such that an inclined angle θ with respect to the base metal surface of the beginning end portion surface becomes a range of 8°<θ<27°.

In accordance with the first aspect, generation of a crack in the overlay layer because of too small inclined angle and generation of a non-deposited portion because of too large inclined angle can be prevented, so that the overlay layer having a high quality can be obtained.

According to a second aspect of the present invention, there is provided a method of overlaying by a laser beam comprising the steps of: relatively moving and irradiating a laser beam with respect to a base metal and simultaneously putting another metal material other than the base metal material on the base metal surface; and forming an overlay layer by melting the other metal material, wherein at a time of forming the overlay layer by overlapping a terminal end portion corresponding to an overlay operation finishing portion over a beginning end portion corresponding to an overlay operation starting portion of the overlay layer, the overlay operation is performed such that a supply amount of the other metal material at a time of overlay operation in the beginning end portion is set to be smaller than a supply amount thereof in the other steady portion.

In accordance with the second aspect, in the case that the supply amount of the other metal material in the beginning end portion is set to be the same as the supply amount thereof in the other steady portion, since an overlay amount in the beginning end portion is too much, an inclined angle with respect to the base metal surface of the beginning end portion becomes large, so that at a time of overlapping the terminal end portion in a melting state over the beginning end portion, a non-deposited portion is generated in the overlap starting portion, which causes generation of a crack.

Accordingly, since the overlay operation is performed by setting the supply amount of the other metal material at a time of overlay operation of the beginning end portion smaller than the supply amount thereof in the other steady portion, the overlay amount in the beginning end portion can be restricted, the non-deposited portion in the overlap portion between the beginning end portion and the terminal end portion is removed and a crack-generation can be prevented.

According to a third aspect of the present invention, as it depends from the second aspect, the overlay operation is performed in a state that when the supply amount of the other metal material in the other steady portion is set to be n and the supply amount of the other metal material in the beginning end portion is set to berm, a relation 0.4 n<m<0.7 n is achieved.

When the supply amount of the other metal material in the beginning end portion is equal to or more than 70% of the supply amount in the other steady portion, the inclined angle with respect to the base metal surface of the beginning end portion becomes large to a value equal to or more than 27 degrees. In this case, at a time of overlapping the terminal end portion in a melting state over the beginning end portion, since the inclined angle is large, the non-deposited portion is generated in the overlap starting portion of the terminal end portion over the beginning end portion.

On the contrary, when the supply amount of the other metal material in the beginning end portion is equal to or less than 40% of the supply amount in the other steady portion, the inclined angle becomes small to a value equal to or less than 8 degrees, and in this case, a heat input to the base metal material is too large and the melting amount of the base metal is increased, so that a large amount of base metal in a melting state is mixed into the other metal material and a crack is generated in the overlay layer at a time of solidification.

Accordingly, by setting the supply amount of the other metal material in the beginning end portion more than 40% and less than 70% of the supply amount in the other steady portion, generation of the crack in the overlay layer because of an increase of the melting amount of the base metal and generation of the non-deposited portion because of the too large inclined angle with respect to the base metal surface of the beginning end portion surface can be prevented, so that an overlay layer having a high quality can be obtained.

According to a fourth aspect of the present invention, there is provided an overlay structure by a laser beam, comprising: a base metal; an overlay layer formed such that a laser beam relatively moves and irradiates with respect to the base metal and that another metal material other than the base metal material is simultaneously put on the base metal surface by melting the other metal material, wherein at a time of forming the overlay layer by overlapping a terminal end portion corresponding to an overlay operation finishing portion over a beginning end portion corresponding to an overlay operation starting portion of the overlay layer, the overlay operation is performed in such a manner that an inclined angle θ with respect to the base metal surface of the overlay layer surface in the beginning end portion becomes a range of 8°<θ<27°.

Accordingly, generation of a crack in the overlay layer because of too small inclined angle and generation of a non-deposited portion because of too large inclined angle can be prevented, so that the overlay layer having a high quality can be obtained.

According to a fifth aspect of the present invention, as it depends from the fourth aspect, the base metal is an aluminum alloy constituting a valve seat portion in a cylinder head of an engine and the other metal material is a copper alloy.

In accordance with the structure mentioned above, a high quality overlay layer in which a non-deposited portion and a crack are not generated is generated in the valve seat portion of the cylinder head lightened by the aluminum alloy by using a copper alloy having a high heat resistance and abrasion resistance.

Accordingly, during an operation of the engine, a heat of the overlay layer constituting the valve seat surface is easily transmitted to the cylinder head body end and a thermal load of the valve seat portion and the valve is reduced, so that a durability can be improved and an output performance of the engine can be improved.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 5 is a table which shows a crack generation state in the case of setting an inclined angle of the beginning end portion surface to be 5 to 40 degrees in the overlaying method by means of a laser beam in accordance with the invention;

Figure 1:
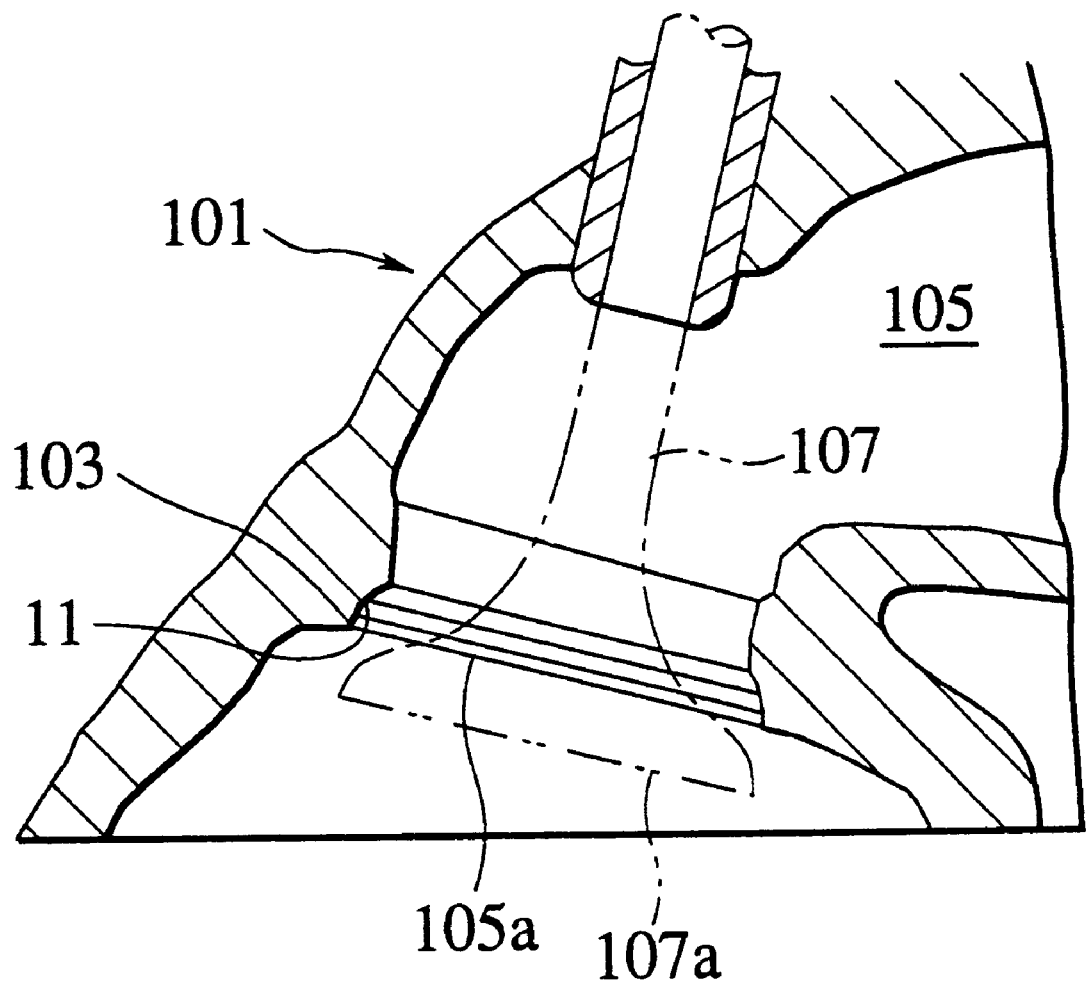
FIG. 1 is a cross sectional view of a periphery of a valve seat portion in a cylinder head.

FIG. 6 is a table which shows a crack generation state in the case of setting an inclined angle of the beginning end portion surface to be 3 to 14 degrees in the overlaying method by means of a laser beam in accordance with the invention; and FIG. 7 is a table which shows a crack generation state in the case of setting an inclined angle of the beginning end portion surface to be 24 to 34 degrees in the overlaying method by means of a laser beam in accordance with the invention.

DETAILED DESCRIPTION OF THE PREFERRED EMBODIMENTS

There will be detailed below the preferred embodiments of the present invention with reference to the accompanying drawings. Like members are designated by like reference characters.

A technique for forming an overlay layer made of the other metal material other than a base material on the base metal by irradiating a laser beam in accordance with the present invention is applied to, for example, a valve seat portion in a cylinder head of an engine for an automotive vehicle. FIG. 1 is a cross sectional view around a valve seat portion 103 in a cylinder head 101, and an opening end 105a opening to a combustion chamber end of an air intake (an exhaust) port 105 is opened and closed by an air intake (an exhaust) valve 107, so that a bevel portion 107a of the intake (the exhaust) valve 107 can be brought into close contact with a seat surface 11 in the valve seat portion 103.

Figure 2:
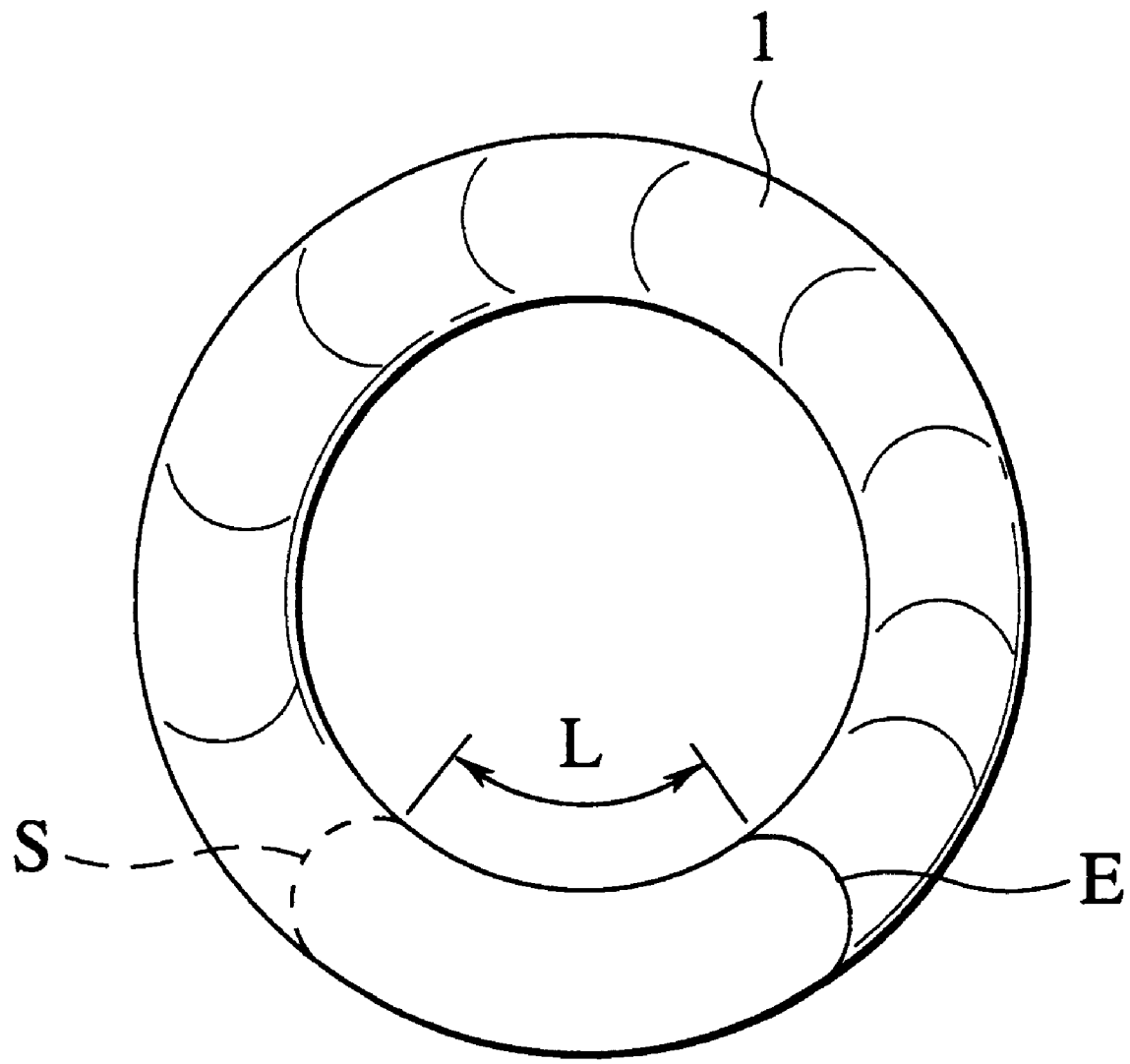
FIG. 2 is a plan view of an overlay layer having an overlap portion in which a terminal end portion is overlapped with a beginning end portion.

In the case of forming the overlay layer on a ring-like portion such as the valve seat mentioned above, as shown in the plan view of FIG. 2, it is necessary to form an overlap portion L by overlapping a terminal end portion E with a beginning end portion S corresponding to an overlaying operation starting portion for the overlay layer, whereby an amount of the overlay can be secured in the portion.

Figure 3:
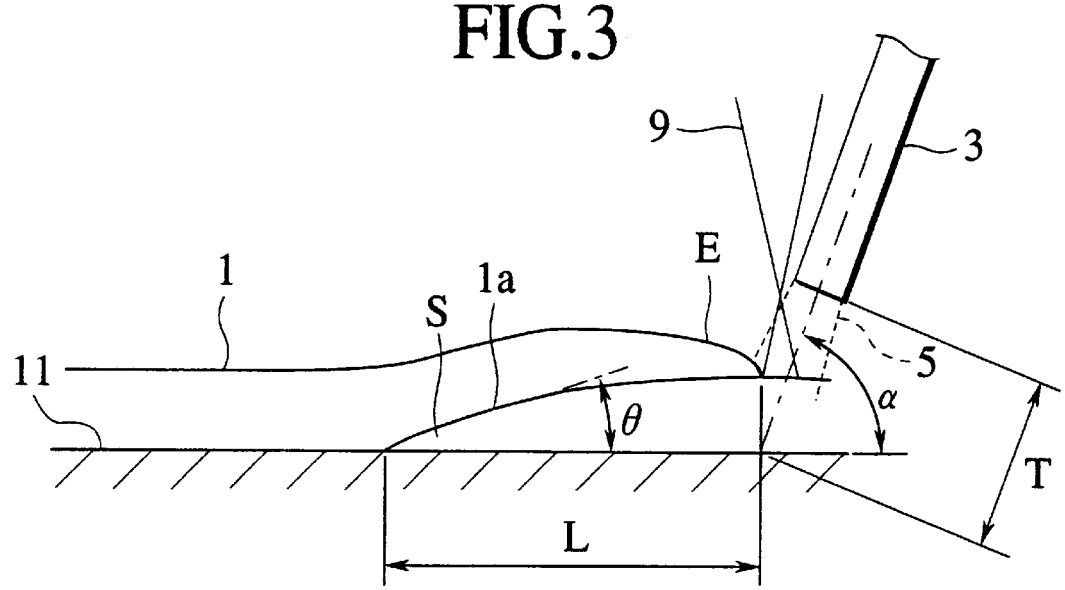
FIG. 3 is a schematic view which shows a concrete embodiment of an overlaying method by means of a laser beam in accordance with an embodiment of the invention.

FIG. 3 shows a method of overlaying by means of a laser beam in accordance with an embodiment of the invention. In this case, an overlay layer 1 is formed on the ring-like valve seat portion in the cylinder head of the engine corresponding to a base metal 11, and there is the overlap portion L in which the beginning end portion S corresponding to an overlap operation starting portion of the overlap layer 1 and the terminal end portion E corresponding to an overlap operation finishing portion are overlapped with each other. The cylinder head is made of an aluminum alloy (JIS: AC2A material), and the other metal material constituting the overlay layer 1 is made of a copper alloy powder (Ni: 15.5%, Co: 14.1%, Al: 0.91%, V: 1.58%, Nb: 1.84%, Si: 2.78%, the other portion: Cu).

The copper alloy powder 5 mentioned above is supplied on the base metal 11 through a powder supply nozzle 3, and a laser beam 9 is irradiated against the copper alloy powder on the supplied base metal 11. Accordingly, after the copper alloy powder is melted, it is solidified so that the overlay layer 1 is formed. At a time of irradiating the laser beam, the laser beam 9 and the powder supply nozzle 3 are in a fixed state without moving, so that the overlay layer 1 is formed all around the periphery of the valve seat by rotating the cylinder head itself around a center axis of the valve seat.

A working condition is as follows:

Laser Beam Mode: Ring Mode

Laser Output: 4.0 kW

Laser Irradiating Direction: Normal Line Direction of Base Metal Surface

Relative Moving Speed of Laser Beam With Respect To Base Metal: 0.8 m/min

Supply Amount of Copper Alloy Powder: 40 g/min

Supply Amount of Copper Alloy Powder in Beginning End Portion: 26 g/min

Figure 4:
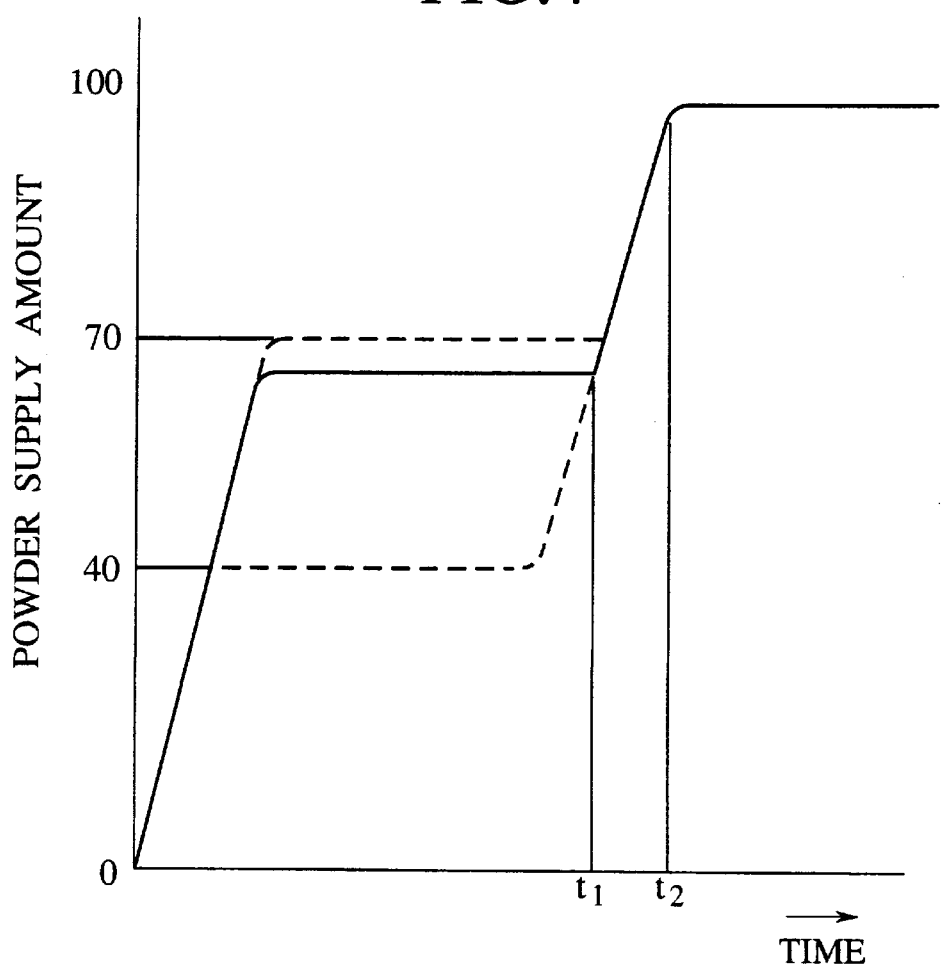
FIG. 4 is a graph which shows a change of a supply amount of a copper alloy powder in the overlaying method shown in FIG. 3.

Inclined Angle α of Powder Supply Nozzle With Respect To Base Metal Surface: 70 degrees Nozzle Inner Diameter (Diameter) of Powder Supply Nozzle: 3 mm Stand Off (T): 10 mm FIG. 4 shows a change of a supply amount of the copper alloy powder 5 in correspondence with a time lapse from a work starting, a supply amount m till a time t1 at which the beginning end portion S corresponding to the overlap portion L is formed is set to be 65% within a range between 40% and 70%, that is, 26 g/min with respect to the supply amount n (40 g/min) in the other steady portion after a time t2 is lapsed.

A result obtained by performing the overlaying operation under the condition mentioned above will be mentioned below.

FIGS. 5 to 7 show a generation state of a crack in accordance with the inclined angle θ when a number of works to be detected is set to be three, as tables. In the tables, "○" shows a result that no crack is generated in all the works, "Δ" shows a result that a crack is generated in one or two works and "X" shows a result that a crack is generated in all the works.

FIG. 5 shows the case that the detection is performed at an interval of 5 degrees in the range between 5 degrees and 40 degrees of the inclined angle θ, and when the inclined angle θ is 5 degrees and equal to or more than 30 degrees, a crack is generated in all the works, and when it is 25 degrees, a crack generation appears in one of the works. FIG. 6 shows a result that the detection is performed at an interval of 1 degree in the range between 3 degrees and 14 degrees with respect to an angle of 5 degrees in which the crack is generated at a high frequency and an inclined angle θ near 10 degrees in which the crack is generated at a low frequency in FIG. 5. In accordance with this, when the angle is equal to or less than 7 degrees, the crack is generated in all the works and when the angle is 8 degrees, the crack is generated in one of the works, and further, when the angle is equal to or more than 9 degrees, no crack appears. FIG. 7 shows a result that the detection is performed at an interval of 1 degree with respect to the inclined angle θ near 25 degrees and 30 degrees in which the crack can be generated in FIG. 5. In accordance with this, when the angle is equal to or less than 26 degrees, no crack is generated in all the works, when the angle is equal to or more than 29 degrees, the crack is generated in all the works, and when the angle is 27 degrees and 28 degrees corresponding to the middle angle thereof, the crack is generated in one and two of the works, respectively.

As mentioned above, by performing the overlay operation in such a manner that the inclined angle θ becomes a range of $8°<θ<27°$, a high quality overlay layer in which the non-deposited portion and the crack is hardly generated can be obtained.

Accordingly, the inclined angle θ with respect to the base metal 11 of the surface 1a of the overlay layer 1 in the beginning end portion S is within the range of $8°<θ<27°$, thereby substantially preventing the non-deposited portion and the crack from generating in the overlap portion L, so that a high quality overlay layer can be obtained.

After the overlay layer is formed in the manner mentioned above, the valve seat surface is formed by a machining process.

While preferred embodiments of the present invention have been described using specific terms, such description is for illustrative purposes, and it is to be understood that changes and variations may be made without departing from the spirit or scope of the following claims.

What is claimed is:

1. An overlay structure by a laser beam, comprising:

a base metal; and an overlay layer formed such that a laser beam relatively moves and irradiates with respect to the base metal and that another metal material other than the base material is simultaneously put on the base metal surface by melting the another metal material, wherein the overlay layer is formed by overlapping a terminal end of the overlay layer over a beginning end of the overlay layer, wherein, when the overlay layer is being formed, a supply amount of the other metal material in the beginning end portion is smaller than a supply amount of the another metal material in a steady portion, an inclined angle θ is formed with respect to the base material surface of the overlay layer surface in the beginning end portion in a range of $8°<θ<27°$.

2. The overlay structure by a laser beam according to claim 1 wherein the base metal is an aluminum alloy constituting a valve seat portion in a cylinder head of an engine and the another metal material is a copper alloy.

* * * * *